United States Patent
Ishida

(10) Patent No.: US 9,818,443 B2
(45) Date of Patent: Nov. 14, 2017

(54) MAGNETIC RECORDING MEDIUM HAVING SPECIFIC UNDERLAYER FEATURES

(71) Applicant: FUJIFILM Corporation, Tokyo (JP)

(72) Inventor: Junpei Ishida, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/223,720

(22) Filed: Jul. 29, 2016

(65) Prior Publication Data

US 2017/0032814 A1   Feb. 2, 2017

(30) Foreign Application Priority Data

Jul. 31, 2015  (JP) .................................. 2015-152953

(51) Int. Cl.
| | |
|---|---|
| G11B 5/73 | (2006.01) |
| G11B 5/738 | (2006.01) |
| G11B 5/733 | (2006.01) |
| G11B 5/708 | (2006.01) |

(52) U.S. Cl.
CPC ............ G11B 5/738 (2013.01); G11B 5/7085 (2013.01); G11B 5/733 (2013.01)

(58) Field of Classification Search
None
See application file for complete search history.

(56) References Cited

U.S. PATENT DOCUMENTS

| | | | | |
|---|---|---|---|---|
| 4,966,797 A | * | 10/1990 | Ishihara | G11B 5/7027 252/62.54 |
| 4,985,295 A | * | 1/1991 | Ishihara | G11B 5/714 428/213 |
| 5,840,410 A | * | 11/1998 | Oiri | C08G 18/0828 360/133 |
| 8,164,857 B2 | | 4/2012 | Noguchi et al. | |
| 8,279,554 B2 | | 10/2012 | Noguchi et al. | |
| 2008/0297950 A1 | | 12/2008 | Noguchi et al. | |
| 2012/0134053 A1 | | 5/2012 | Noguchi et al. | |

FOREIGN PATENT DOCUMENTS

| | | | | | |
|---|---|---|---|---|---|
| JP | 61175924 A | * | 8/1986 | | |
| JP | 63004412 A | * | 1/1988 | | |
| JP | 06004854 A | * | 1/1994 | | |
| JP | 08249649 A | * | 9/1996 | ......... | C08G 18/0828 |
| JP | 09-282639 A | | 10/1997 | | |
| JP | 2004-342171 A | | 12/2004 | | |
| JP | 2009-054270 A | | 3/2009 | | |

* cited by examiner

*Primary Examiner* — Kevin Bernatz
(74) *Attorney, Agent, or Firm* — Sughrue Mion, PLLC

(57) ABSTRACT

The magnetic recording medium has a nonmagnetic layer satisfying: the ratio of the total area accounted for by voids observed to the area of the observed region falls within a range of 13.0% to 25.0% in a sectional image taken by SEM; $R+\sigma r$ is 58.0 nm or less and $R-\sigma r$ is 21.0 nm or greater when denoting the average value of the diameters of corresponding circles for voids observed in the sectional image as R, denoting the standard deviation of the diameters of the corresponding circles as $\sigma r$; $N+\sigma n$ is 185 voids/$\mu m^2$ or less and $N-\sigma n$ is 120 voids/$\mu m^2$ or greater when denoting the average number of voids observed per $\mu m^2$ unit area of the observed region in the sectional image as N, denoting the standard deviation of this number as $\sigma n$; and the thickness of the nonmagnetic layer is 0.20 $\mu m$ or greater.

19 Claims, No Drawings

MAGNETIC RECORDING MEDIUM HAVING SPECIFIC UNDERLAYER FEATURES

CROSS-REFERENCE TO RELATED APPLICATIONS

This application claims priority under 35 U.S.C 119 to Japanese Patent Application No. 2015-152953 filed on Jul. 31, 2015. The above application is hereby expressly incorporated by reference, in its entirety.

BACKGROUND OF THE INVENTION

Field of the Invention

The present invention relates to a magnetic recording medium.

Discussion of the Background

A signal that has been recorded on a magnetic recording medium such as a magnetic tape is normally reproduced by running the magnetic recording medium in a drive to cause the surface of the magnetic layer to come into contact with (slide across) a magnetic reproduction head (also referred to hereinafter simply as a "head"). Abrasives are widely incorporated into the magnetic layer to impart to the surface of the magnetic layer a function of removing foreign material that has adhered to the head during such running (for example, see Japanese Unexamined Patent Publication (KOKAI) Heisei No. 9-282639, Japanese Unexamined Patent Publication (KOKAI) No. 2009-054270 or English language family numbers US2008/297950A1, U.S. Pat. No. 8,164,857, US2012/134053A1 and U.S. Pat. No. 8,279,554, and Japanese Unexamined Patent Publication (KOKAI) No. 2004-342171, which are expressly incorporated herein by reference in their entirety).

SUMMARY OF THE INVENTION

In reproducing a signal that has been recorded on a magnetic recording medium, the presence of foreign material between the surface of the magnetic recording medium (surface of the magnetic layer) and the head may produce output fluctuation known as spacing loss, thereby compromising the electromagnetic characteristics with repeated running. Accordingly, it is desirable to reduce spacing loss to inhibit a drop in the electromagnetic characteristics with repeated running. In this regard, the incorporation of abrasive into the magnetic layer can reduce spacing loss due to foreign material adhering to the head, and can thus be considered an effective way to inhibit the drop in the electromagnetic characteristics with repeated running. However, with the increased recording densities of recent years, market demand for enhanced performance in magnetic recording media has continued to grow stronger. Under these conditions, the need to further decrease the drop in the magnetic characteristics due to repeated running is greater than what can be achieved by simply incorporating an abrasive into the magnetic layer.

An aspect of the present invention provides for a magnetic recording medium in which the drop in the magnetic characteristics with repeated running is inhibited.

An aspect of the present invention relates to a magnetic recording medium that has a nonmagnetic layer containing nonmagnetic powder and binder on a nonmagnetic support and a magnetic layer containing ferromagnetic powder, binder, and abrasive on the nonmagnetic layer, wherein the nonmagnetic layer satisfies conditions 1 to 4 below:

condition 1: the ratio of the total area accounted for by voids observed to the area of the region being observed falls within a range of 13.0% to 25.0% in a sectional image taken by a scanning electron microscope;

condition 2: $R+\sigma r$ is less than or equal to 58.0 nm and $R-\sigma r$ is greater than or equal to 21.0 nm when denoting the average value of the diameters of corresponding circles for voids observed in the sectional image as R, denoting the standard deviation of the diameters of the corresponding circles as $\sigma r$, and denoting R and $\sigma r$ in units of nm;

condition 3: $N+\sigma n$ is less than or equal to 185 voids/$\mu m^2$ and $N-\sigma n$ is greater than or equal to 120 voids/$\mu m^2$ when denoting the average number of voids observed per $\mu m^2$ unit area of the region being observed in the sectional image as N, denoting the standard deviation of this number as $\sigma n$, and denoting N and $\sigma n$ in units of voids/$\mu m^2$;

condition 4: the thickness of the nonmagnetic layer is greater than or equal to 0.20 $\mu m$.

It has become revealed that the above magnetic recording medium can exhibit good electromagnetic characteristics even with repeated running and can be used as a magnetic recording medium for high-density recording.

The following presumptions by the present inventor are not intended to limit the present invention in any way. The present inventor presumes the following.

The reason that the electromagnetic characteristics deteriorate with repeated running is assumed to be shaving of a portion of the head (referred to as "head abrasion" hereinafter) with the repeated running of a magnetic recording medium. When a portion of the head is shaved off, spacing ends up being present between the surface of the magnetic layer and the head when they are brought into contact. Through extensive research, the present inventor has come to presume that head abrasion exists both in the form of abrasion due to abrasive (where the head is shaved by abrasive) and abrasion caused by portions of the layers on the nonmagnetic support (the magnetic layer and the nonmagnetic layer positioned beneath it; also referred to as a "coating film" hereinafter) of the magnetic recording medium being locally damaged, with the resulting pieces of coating film being present between the surface of the magnetic recording medium and the head during running (the abrasion produced by foreign material that is present between two surfaces in this manner as generally called "3 body wear"). Further extensive research conducted to inhibit the occurrence of these forms of head abrasion resulted in the discovery that a magnetic recording medium that satisfied conditions 1 to 4 could exhibit good electromagnetic characteristics even with repeated running in a drive. This will be described more specifically below.

In the course of the surface of the magnetic layer and the head coming into contact during running, it is possible to prevent the head from being shaved by the abrasive by suitably sinking the abrasive down into the magnetic layer. In this regard, the present inventor presumes that the nonmagnetic layer positioned beneath the magnetic layer can play a role in controlling this sinking, and that by adjusting the thickness of the nonmagnetic layer (condition 4) and variation in the state of presence and size of voids in the nonmagnetic layer (conditions 1 to 3), it is possible to control sinking of the abrasive during running to a degree where the abrasive does not greatly shave the head. Further, variation in the state of presence and size of voids in the nonmagnetic layer is also thought to affect the durability of the nonmagnetic layer (as well as the durability of the magnetic layer that is present on the nonmagnetic layer). The present inventor presumes that it is possible to control the occurrence of head abrasion due to localized damage of the coating film by adjusting the variation in the state of presence and size of voids in the nonmagnetic layer (conditions 1 to 3).

The present inventor presumes that by preventing head abrasion by having the nonmagnetic layer satisfy conditions 1 to 4, it is possible for a magnetic recording medium to exhibit good electromagnetic characteristics even with repeated running in a drive. However, this is merely a presumption by the present inventor and is not intended to limit the present invention in any way.

In one embodiment, the nonmagnetic powder contained in the nonmagnetic layer contains at least carbon black.

In one embodiment, the content of carbon black in the nonmagnetic layer is greater than or equal to 30.0 weight parts per 100.0 weight parts of nonmagnetic powder. The term "100.0 weight parts of nonmagnetic powder" means 100.0 weight parts of the combined content of the nonmagnetic powders when the nonmagnetic layer contains two or more nonmagnetic powders. For other components as well, when two or more types of a given component are contained, the content of that component refers to the combined content of the two or more types. The term "nonmagnetic powder" means an aggregation of multiple nonmagnetic particles. The term "aggregation" is not limited to forms in which the constituent particles are in direct contact, but also includes forms in which the binder, additives, and the like that are described further below are present between the particles. The term "particles" will sometimes be used to denote powder. The above points also apply to the various powders described in the present invention and Specification.

In one embodiment, the content of carbon black in the nonmagnetic layer is greater than or equal to 40.0 weight parts per 100.0 weight parts of nonmagnetic powder.

In one embodiment, the content of binder in the nonmagnetic layer is less than or equal to 42.0 volume parts per 100.0 volume parts of nonmagnetic powder and binder combined.

In one embodiment, the content of binder in the nonmagnetic layer is less than or equal to 40.0 volume parts per 100.0 volume parts of nonmagnetic powder and binder combined.

In one embodiment, the nonmagnetic powder contained in the nonmagnetic layer contains at least carbon black the average particle size of which falls within a range of 10 nm to 30 nm, and the content of carbon black the average particle size of which falls within a range of 10 nm to 30 nm in the nonmagnetic layer is greater than or equal to 40.0 weight parts per 100.0 weight parts of nonmagnetic powder.

In one embodiment, the above ratio in condition 1 falls within a range of 15.0% to 25.0%.

In one embodiment, condition 4 is condition 4-1 below:
condition 4-1: the thickness of the nonmagnetic layer is greater than or equal to 0.20 μm but less than or equal to 2.00 μm.

In one embodiment, condition 4 is condition 4-2 below:
condition 4-2: the thickness of the nonmagnetic layer is greater than or equal to 0.30 μm but less than or equal to 1.50 μm.

A further aspect of the present invention relates to a magnetic signal reproducing device including the above magnetic recording medium and a magnetic reproduction head.

In one embodiment, the magnetic signal reproducing device reproduces with the above magnetic reproduction head a signal that has been recorded at a recording density of greater than or equal to 260 kfci on the above magnetic recording medium.

An aspect of the present invention can provide a magnetic recording medium exhibiting good electromagnetic characteristics even with repeated running.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

An aspect of the present invention relates to a magnetic recording medium that has a nonmagnetic layer containing nonmagnetic powder and binder on a nonmagnetic support and a magnetic layer containing ferromagnetic powder, binder, and abrasive on the nonmagnetic layer, wherein the nonmagnetic layer satisfies conditions 1 to 4 below:

condition 1: the ratio of the total area accounted for by voids observed to the area of the region being observed falls within a range of 13.0% to 25.0% in a sectional image taken by a scanning electron microscope;

condition 2: $R+\sigma r$ is less than or equal to 58.0 nm and $R-\sigma r$ is greater than or equal to 21.0 nm when denoting the average value of the diameters of corresponding circles for voids observed in the sectional image as R, denoting the standard deviation of the diameters of the corresponding circles as $\sigma r$, and denoting R and $\sigma r$ in units of nm;

condition 3: $N+\sigma n$ is less than or equal to 185 voids/μm² and $N-\sigma n$ is greater than or equal to 120 voids/μm² when denoting the average number of voids observed per μm² unit area of the region being observed in the sectional image as N, denoting the standard deviation of this number as σn, and denoting N and σn in units of voids/μm²;

condition 4: the thickness of the nonmagnetic layer is greater than or equal to 0.20 μm.

As set forth above, the present inventor presumes that inhibiting head abrasion by means of conditions 1 to 4 can contribute to inhibiting the drop in the electromagnetic characteristics due to repeated running. This will be described in detail below.

<Conditions 1 to 4>

(Condition 1)

In the nonmagnetic layer of the magnetic recording medium, the ratio of the total area accounted for by voids observed (also referred to as the "void ratio" hereinafter) to the area of the region being observed falls within a range of 13.0% to 25.0% (condition 1) in a sectional image taken by a scanning electron microscope (also referred to as "SEM" hereinafter). The present inventor presumes that a void ratio of greater than or equal to 13.0% can contribute to inhibiting the occurrence of head abrasion caused by abrasives, and a void ratio of less than or equal to 25.0% can contribute to inhibiting the generation of head abrasion due to localized damage of coating film. On that basis, the void ratio desirably falls within a range of 15.0% to 25.0%, preferably falls within a range of 15.0% to 24.5%, more preferably falls within a range of 15.0% to 24.0%, and still more preferably, falls within a range of 15.0% to 23.5%.

(Condition 2)

In the nonmagnetic layer of the above magnetic recording medium, R+σr is less than or equal to 58.0 nm and R−σr is greater than or equal to 21.0 nm (condition 2) when denoting the average value of the diameters of corresponding circles for voids observed in the sectional image as R, denoting the standard deviation of the diameters of the corresponding circles as σr, and denoting R and σr in units of nm. The R+σr and R−σr of condition 2 can be indicators of the variation in the size of the voids present in the nonmagnetic layer. The greater R+σr, the greater the number of large voids exceeding the average size of voids present in the nonmagnetic layer indicated, and the smaller R−σr, the lower the number of voids falling below the average size indicated. The present inventor presumes that large voids exceeding the average size tend to locally damage the nonmagnetic layer by becoming starting points of voids during running, and that causing local damage to the nonmagnetic layer tends to cause local damage to the magnetic layer positioned above it. That is, the present inventor presumes that the coating film tends to undergo localized damage. The present inventor presumes that keeping R+σr to less than or equal to 58.0 nm, desirably to less than or equal to 56.0 nm, and preferably to less than or equal to 54.0 nm, can contribute to inhibiting head abrasion due to localized damage of the coating film. Conversely, since the nonmagnetic layer becomes locally harder than other portions in the vicinity of small voids falling below the average size, the present inventor presumes that these small voids impede the sinking in of abrasive during running, with the head then being substantially shaved by the abrasive. The present inventor presumes that keeping R−σr to greater than or equal to 21.0 nm, desirably to greater than or equal to 23.0 nm, and preferably to greater than or equal to 25.0 nm, can contribute to inhibiting head abrasion caused by abrasive.

(Condition 3)

In the nonmagnetic layer of the above magnetic recording medium, N+σn is less than or equal to 185 voids/μm² and N−σn is greater than or equal to 120 voids/μm² (condition 3) when denoting the average number of voids observed per μm² unit area of the region being observed in the sectional image as N, denoting the standard deviation of this number as σn, and denoting N and σn denoted in units of voids/μm². As relates to condition 3, N+σn and N−σn can be indicators of variation in the state in which voids are present in the nonmagnetic layer (specifically, whether numerous or few localized voids are present in the nonmagnetic layer). The greater N+σn, the greater the presence of portions in which numerous voids are locally present in the nonmagnetic layer that is indicated. The lower N+σn, the lesser the presence of portions in which numerous voids are locally present in the nonmagnetic layer that is indicated. The present inventor presumes that portions of the nonmagnetic layer in which numerous voids are locally present have a greater tendency to undergo localized damage than other portions during running, and that the magnetic layer positioned above has a greater tendency to be locally damaged due to localized damage of the nonmagnetic layer. That is, the present inventor presumes that the coating film tends to be locally damaged. The present inventor presumes that keeping N+σn to fewer than or equal to 185 voids/μm², desirably fewer than or equal to 180 voids/μm², and preferably fewer than or equal to 175 voids/μm², can contribute to inhibiting head abrasion caused by localized damage to the coating film. Conversely, the present inventor presumes that since portions with few localized voids are locally harder than other portions, they impede the sinking in of abrasive during running, with the head then being substantially shaved by abrasive. The present inventor presumes that keeping N−σn to greater than or equal to 120 voids/μm², desirably greater than or equal to 125 voids/μm², and preferably greater than or equal to 130 voids/μm², can contribute to inhibiting head abrasion by abrasive.

Methods of adjusting various values relating to conditions 1 to 3 set forth above will be described further below.

(Condition 4)

The nonmagnetic layer of the above magnetic recording medium satisfies conditions 1 to 3 and is greater than or equal to 0.20 μm in thickness (condition 4). The present inventor presumes that keeping the thickness of the nonmagnetic layer to greater than or equal to 0.20 μm, desirably greater than or equal to 0.30 can inhibit head abrasion by abrasive. Additionally, when taking into account thickness reduction to increase the recording capacity of a magnetic recording medium, the thickness of the nonmagnetic layer is desirably less than or equal to 2.00 μm, preferably less than or equal to 1.50 μm. Based on the above, condition 4 is desirably condition 4-1 below and preferably condition 4-2 below. The thickness of the nonmagnetic layer can be adjusted by means of the manufacturing conditions of the magnetic recording medium, more specifically, the amount of nonmagnetic layer-forming composition that is coated, the calendering conditions, and the like. Generally, the greater the quantity that is coated, the thicker the nonmagnetic layer, and the more rigorous the calendering conditions (such as employing a high calender pressure), the thinner the nonmagnetic layer will tend to be.

Condition 4-1: A nonmagnetic layer thickness of greater than or equal to 0.20 μm but less than or equal to 2.00 μm.

Condition 4-2: A nonmagnetic layer thickness of greater than or equal to 0.30 μm but less than or equal to 1.50 μm.

(Measurement Method)

The various values relating to conditions 1 to 4 are obtained by the following methods.

(1) Preparation of Samples for Sectional Observation

Samples for sectional observation are prepared by cutting them out of the magnetic recording medium the void ratio of which is to be determined at randomly determined positions. Samples for sectional observation are prepared by focused ion beam (FIB) processing employing a gallium ion ($Ga^+$) beam. Specific examples of this preparation method are described further below in Examples.

(2) Specifying the Observation Region

The samples for sectional observation that have been prepared are observed by SEM and a sectional image (SEM image) is taken. A field emission scanning electron microscope (FE-SEM) is employed as the scanning electron microscope. For example, an FE-SEM S4800 made by Hitachi, Ltd. can be employed. This FE-SEM is employed in Examples given further below.

For a given sample for sectional observation, the SEM images are taken such that (i) none of the imaged regions overlap, (ii) the outermost surface on the magnetic layer side (outer surface of the magnetic layer) falls within the SEM images, and (iii) the entire region in the direction of thickness of the sample for sectional observation (that is, the region from the outermost surface on the magnetic layer side to the outermost surface on the other side) falls within the SEM images. Alternatively, when the entire region in the direction of thickness of the sample for sectional observation cannot be brought within the SEM images, images are taken such that portions, other than points selected so that the proportion occupied by the imaged portion of the sample for sectional observation relative to the entire area of the SEM images makes up 80% to 100%, are located at randomly selected positions. A total of four images are taken.

The above SEM images are secondary electron (SE) images taken at an acceleration voltage of 5 kV, an imaging magnification of 100,000-fold, with 960 pixels vertically× 1,280 pixels horizontally. The SEM images that have been taken are loaded into WinROOF image-processing software made by Mitani Corporation and the portion (observation region) of the nonmagnetic layer is selected in the SEM images. In selecting the observation region, the length of the observation region in the direction of width is the total width of the SEM images that has been taken. The "direction of width" as referred to in regard to the SEM images is the direction of width in the sample for sectional observation. The "direction of width in the sample for sectional observation" is the direction of width of the magnetic recording medium out of which the sample has been cut. The same applies to the direction of thickness with regard to the above.

The junction between the magnetic layer and the nonmagnetic layer in the direction of thickness is specified by the following method. The SEM images are digitized to prepare image brightness data (comprised of the three components of a direction of thickness coordinate, a direction of width coordinate, and brightness) in the direction of thickness. In digitization, the SEM images are divided into 1,280 parts in the direction of width and processed with 8 brightness bits to obtain 256 gradation data. The image brightness of each coordinate point that has been divided out is converted to a specific gradation value. Next, the average value of the brightness in the direction of width at each of the coordinate points in the direction of width (that is, the average value of the brightness at each of the 1,280 coordinate points that have been divided out) is plotted on the vertical axis, and the coordinate in the direction of thickness is plotted on the horizontal axis to prepare a brightness curve. The brightness curve that has been prepared is differentiated to prepare a differential curve. The coordinates of the boundary between the magnetic layer and the nonmagnetic layer are specified based on the peak position of the differential curve that has been prepared. Points corresponding to the specified coordinates in the SEM images are adopted as the junction between the magnetic layer and the nonmagnetic layer. When a portion of the nonmagnetic support is contained in the SEM images, the junction between the nonmagnetic layer and nonmagnetic support is specified. The above magnetic recording medium is a particulate magnetic recording medium. In a particulate magnetic recording medium, the junction between the nonmagnetic layer and the nonmagnetic support is more clearly recognizable than the junction between the magnetic layer and nonmagnetic layer. Thus, the junction between the nonmagnetic layer and the nonmagnetic support can be specified by visually examining the SEM images. However, it can also be specified using a brightness curve in the same manner as set forth above. When no portion of the nonmagnetic support is contained in the SEM images, the observation region is specified so that the entire region in the direction of thickness from the specified junction between the magnetic layer and the nonmagnetic layer (that is, the outer surface of the nonmagnetic layer) to the nonmagnetic layer portion is included. Additionally, when a portion of the nonmagnetic support is contained in the SEM images, the observation region is specified so as to include the entire region from the specified junction between the magnetic layer and the nonmagnetic layer (that is, the outer layer of the nonmagnetic layer on the magnetic layer side) and the junction between the nonmagnetic layer and the nonmagnetic support (that is, the outer surface on the nonmagnetic support side of the nonmagnetic layer).

(3) Specifying Voids and Calculating the Void Ratio, R+σr, R−σr, N+σn, and N−σn

Sharpening processing, which is a function of the above WinROOF image processing software made by Mitani Corporation, is conducted on the observation region specified in (2) above. Processing is then conducted to eliminate (4 pixels/1,280 pixels) noise, and the contours of voids that are present in the observation region are emphasized. The contours of the voids that are present in the observation region are manually selected, and the contours and the portions enclosed by the contours are then binary processed with the above image processing software. At that time, portions with a binary area of less than 25 $nm^2$ are deemed to be noise, not voids, and eliminated. Portions with a binary area of greater than or equal to 25 $nm^2$ are specified as voids. Next, the areas of the portions that have been specified as voids are summed to obtain the total void area. The void ratio is then calculated from the equation given below. The void ratio is obtained for each of four images. The average value thereof is adopted as the void ratio. In the present invention and in the present Specification, the term "average value" refers to the arithmetic average. In the following equation, the unit of the total void area and the area of the observation region can be $nm^2$, $\mu m^2$, or some other unit so long as it is the same for both.

Void ratio (%)=(total void area/area of observation region)×100

In portions where the binary area is greater than or equal to 25 $nm^2$, the diameters of circles identical in area to the respective binary areas are calculated and adopted as the diameters of corresponding circles. The average value of the diameters of the corresponding circles obtained from four images is adopted as R (nm) and the standard deviation of the diameters of the corresponding circles is adopted as σr (nm). R+σr and R−σr are calculated based on the R and σr obtained.

For each of the four images taken, the observation region specified in (2) above was divided equally in half in the X direction (width direction) and in the Y direction (thickness direction), yielding four equal sections. Thus, 4 images×4 sections yielded a total of 16 sections. Next, the number of portions (voids) in which the binary area was greater than or equal to 25 nm$^2$ in that section was counted. The number of voids counted was then divided by the area of a single section (μm$^2$) to obtain the number of voids present per unit area of 1 μm$^2$ in each section. The average value of the numbers obtained for the 16 sections was adopted as N (voids/μm$^2$) and the standard deviation thereof as σn (voids/μm$^2$).

Some of the voids that are present in the observation region lie within the observation region and some lie outside the observation region. For such voids, the area of those voids lying within the observation region is used to calculate the total area of the voids in the course of calculating the void ratio. The area of those lying outside the observation region is not included in the course of calculating the total area.

Further, the diameters of corresponding circles are calculated for such voids and employed to calculate R and σr. The binary areas that are employed to calculate the diameters of corresponding circles for such voids also include the areas of portions of voids lying outside the observation region. In the course of calculating N and σn, voids having a portion lying inside the observation region and a portion lying outside the observation region are included. The same applies to voids that are contained in the above segments.

(4) Measuring the Thickness of the Nonmagnetic Layer

The thickness of the nonmagnetic layer is measured by the following method.

The sample for sectional observation that was prepared by the method set forth in (1) above is observed by SEM and sectional images (SEM images) are taken. A field emission scanning electron microscope (FE-SEM) is employed as the scanning electron microscope. For example, an FE-SEM S4800 made by Hitachi, Ltd. can be employed. This FE-SEM was employed in Examples further below.

SEM images are taken in three randomly selected spots in the sample for sectional observation that has been prepared so that each image contains the entire range of the nonmagnetic layer in the direction of thickness, and such that at least a portion of the nonmagnetic layer and at least a portion of the nonmagnetic support fall within the SEM image. A total of three such SEM images are taken.

Each of these SEM images is a secondary electron (SE) image taken at an acceleration voltage of 5 kV, an image magnification of 20,000-fold, with 960 pixels vertically and 1,280 pixels horizontally. The junction between the magnetic layer and the nonmagnetic layer, and the junction between the nonmagnetic layer and the nonmagnetic support, are specified by the method set forth in (2) above. In Examples described further below, the junction between the nonmagnetic layer and the nonmagnetic support was specified visually.

At one random spot on each SEM image, the spacing between the two junctions specified by the above methods in the direction of thickness is determined, and the average of the values obtained from the three images is adopted as the thickness of the nonmagnetic layer.

(Adjustment Methods)

The various values relating to conditions 1 to 4 and the thickness of the nonmagnetic layer with regard to condition 4 are adjusted as set forth above.

The various values relating to voids in the nonmagnetic layer with regard to conditions 1 to 3 can be adjusted based on one or more of (1) to (4) below, for example.

(1) Type and Size of Nonmagnetic Powder Contained in the Nonmagnetic Layer

One or more types of nonmagnetic powder can be employed as the nonmagnetic powder contained in the nonmagnetic layer. The nonmagnetic powder can be an inorganic material or an organic material. It is also possible to employ carbon black. The present inventor presumes that from the perspective of keeping R+σr and R−σr relating to condition 2 within the ranges set forth above by reducing variation in the size of the voids contained in the nonmagnetic layer, it is desirable to use a nonmagnetic powder having a shape that is isotropic rather than nonmagnetic powder that is anisotropic in shape and desirable to increase the proportion of the nonmagnetic powder that is accounted for by nonmagnetic powder that is isotropic in shape. In this regard, the shape of carbon black tends to be more isotropic than other various nonmagnetic powders. Accordingly, the nonmagnetic powder in the nonmagnetic layer desirably contains at least carbon black. The proportion of the nonmagnetic powder in the nonmagnetic layer that is accounted for by carbon black is desirably greater than or equal to 30.0 weight parts, preferably greater than or equal to 40.0 weight parts, more preferably greater than or equal to 50.0 weight parts, still more preferably greater than or equal to 60.0 weight parts, yet more preferably greater than or equal to 70 weight parts, yet still more preferably greater than or equal to 80.0 weight parts, even more preferably greater than or equal to 90.0 weight parts, and yet even more preferably, 100.0 weight parts per 100.0 weight parts of nonmagnetic powder. The ratio of nonmagnetic powder in the nonmagnetic layer accounted for by carbon black, for example, can be less than or equal to 90.0 weight parts, less than or equal to 80.0 weight parts, or as set forth above, for example, 100.0 weight parts.

With regard to the size of the carbon black in reference to condition 1, for example, the larger the average particle size of the carbon black employed, the greater the void ratio tends to be, and the smaller the average particle size of the carbon black employed, the lower the void ratio tends to be. Further, in reference to condition 2, the larger the average particle size of the carbon black employed, the more numerous voids exceeding the average size and the larger R+σr tend to become, and the smaller the average particle size of the carbon black employed, the more numerous voids with a size lower than the average size and the smaller R−σr tend to become. In reference to condition 3, the larger the average particle size of the carbon black employed, the more portions with few localized voids tend to be produced and the lower N−σn tends to be. The smaller the average particle size of the carbon black employed, the more portions with numerous localized voids tend to be produced in the nonmagnetic layer and the greater N+σn tends to be. Based on these points, from the perspective of keeping the various values relating to conditions 1 to 3 within the ranges set forth above, the nonmagnetic layer desirably contains carbon black with an average particle size falling within a range of 10 nm to 30 nm.

In the present invention and the present Specification, the average particle size of carbon black and other various powders is a value that is measured by the following method with a transmission electron microscope.

The powder is photographed at an image magnification of 100,000-fold by a transmission electron microscope, and printed onto print paper at a total magnification of 500,000-fold to obtain a particle photograph comprised of powder. Target particles are selected in the particle photograph thus obtained, the contours of the particles are traced with a digitizer, and the size of the particles (primary particles) is measured. The term "primary particle" refers to independent particles that have not aggregated.

Five hundred randomly extracted particles are measured as set forth above. The arithmetic average of the particle sizes of the 500 particles thus obtained is adopted as the average particle size of the powder. By way of example, a model H-9000 transmission electron microscope made by Hitachi is employed as the transmission electron microscope. The particle size can be measured with known image analysis software, such as KS-400 image analysis software put out by Carl Zeiss, for example.

In the present invention and in the present Specification, the particle size of carbon black, ferromagnetic powder, and other powders refers to the average particle size obtained by the above method, unless specifically stated otherwise. The average particle sizes given in Examples further below were measured with a model H-9000 transmission electron microscope made by Hitachi as the transmission electron microscope and image analysis software KS-400 put out by Carl Zeiss as the image analysis software.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and in the present Specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The nonmagnetic layer can contain nonmagnetic powder other than carbon black. As set forth above, this nonmagnetic powder can be of either inorganic material or organic material. Examples of inorganic materials are metals, metal oxides, metal carbonates, metal sulfates, metal nitrides, metal carbides, and metal sulfides. These nonmagnetic powders are available as commercial products and can be manufactured by known methods. For details, see Japanese Unexamined Patent Publication (KOKAI) No. 2010-24113, paragraphs 0035 to 0041. The content of the above publication is expressly incorporated herein by reference in its entirety. The average particle size of nonmagnetic powders other than carbon black, for example, falls within a range of 0.015 μm to 0.300 μm, desirably within a range of 0.020 μm to 0.200 μm. The proportion accounted for by nonmagnetic powder (the combined total when two or more are employed) other than carbon black in the nonmagnetic powder of the nonmagnetic layer desirably falls within a range of 0 to 50.0 weight parts, preferably within a range of 0 to 40.0 weight parts, and more preferably, within a range of 0 to 30 weight parts, per 100.0 weight parts of nonmagnetic powder in the nonmagnetic layer.

The content of nonmagnetic powder in the nonmagnetic layer desirably falls within a range of 50 weight % to 90 weight %, preferably within a range of 60 weight % to 90 weight %.

(2) Binder Content in the Nonmagnetic Layer

In reference to condition 1, the more the content of binder in the nonmagnetic layer is increased, the more the void ratio tends to decrease, and the greater the increase, the lower the void ratio tends to become. In reference to condition 2, the greater the content of binder in the nonmagnetic layer, the more small voids falling below the average size increase and the more R−σr tends to decrease. The lower this content becomes, the greater the increase in voids exceeding the average particle size and the larger R+σr tends to become. In reference to condition 3, the more the binder content in the nonmagnetic layer is increased, the more portions with few localized voids are produced in the nonmagnetic layer and the smaller N−σn tends to become. The more the binder content is decreased, the more portions with numerous voids tend to form and the higher N−σn tends to become. Based on these points, from the perspective of keeping the various values relating to conditions 1 to 3 to within the above ranges, the content of binder in the nonmagnetic layer is desirably less than or equal to 42.0 volume parts, preferably less than or equal to 40.0 volume parts, per 100.0 volume parts of the combined contents of the nonmagnetic powder and binder. The binder content in the nonmagnetic layer is, for example, greater than or equal to 10.0 volume parts, desirably greater than or equal to 20.0 volume parts, per 100.0 volume parts of the combined content of nonmagnetic powder and binder.

(3) Dispersion Conditions for the Nonmagnetic Layer-Forming Composition

The nonmagnetic layer-forming composition can be prepared, for example, by simultaneously or sequentially mixing and dispersion processing nonmagnetic powder, binder, one or more optionally added additives, and one or more solvents. Details regarding dispersion processing will be given further below. In reference to condition 1, the longer the dispersion period employed, the lower the void ratio tends to be. The shorter it is made, the higher the void ratio tends to be.

In dispersion processing the nonmagnetic layer-forming composition, additives (dispersing agents) that can enhance dispersion of the nonmagnetic powder in the composition can be employed. The greater the dispersion of the nonmagnetic powder achieved in the nonmagnetic layer-forming composition by using a dispersing agent, the lower the void ratio tends to be.

One or more known dispersing agents can be employed as dispersing agents based on the type of nonmagnetic powder in the nonmagnetic layer. Organic tertiary amines are examples of dispersing agents for carbon black. Reference can be made to Japanese Unexamined Patent Publication (KOKAI) No. 2013-049832, paragraphs 0011 to 0018 and 0021, with regard to organic tertiary amines. Reference can be made to the same publication, paragraphs 0022 to 0024 and 0027, with regard to the formula and the like of the composition to increase dispersion of carbon black with organic tertiary amines. The content of the above publication is expressly incorporated herein by reference in its entirety.

These amines are preferably trialkylamines. The alkyl groups present in trialkylamines are desirably alkyl groups with 1 to 18 carbon atoms. The three alkyl groups present in a trialkylamine can be identical or different. For details regarding alkyl groups, reference can be made to Japanese Unexamined Patent Publication No. 2013-049832, paragraphs 0015 and 0016. Trioctylamines are particularly desirable as trialkylamines.

(4) Drying Conditions when Forming the Nonmagnetic Layer

The nonmagnetic layer can be formed by sequentially multilayer coating or simultaneously multilayer coating the nonmagnetic layer-forming composition and the magnetic layer-forming composition on a nonmagnetic support. In sequential multilayer coating, the nonmagnetic layer-forming composition is coated on a nonmagnetic support and then dried, after which the magnetic layer-forming composition is applied. Here, the faster drying of the nonmagnetic layer-forming composition progresses, the greater the tendency for variation in the state of presence of voids in the nonmagnetic layer to be produced, the greater N+σn relating to condition 3 tends to become, and the smaller N−σn tends to become. In simultaneous multilayer coating, the magnetic layer-forming composition is applied over the nonmagnetic layer-forming composition while the latter is still wet, and then subjected to a drying treatment. In the drying treatment, the faster drying progresses, the greater the tendency for variation in the state of presence of voids in the nonmagnetic layer to be produced, the greater N+σn relating to condition 3 tends to become, and the smaller N−σn tends to become. From the perspective of facilitating adjustment of the various values relating to condition 3, sequential multilayer coating is desirable.

Specific embodiments of the magnetic recording medium according to an aspect of the present invention will be described next. However, in the magnetic recording medium according to an aspect of the present invention, it suffices for a magnetic layer containing ferromagnetic powder, binder, and abrasive to be present on a nonmagnetic layer satisfying conditions 1 to 4 set forth above. There is no limitation to the specific embodiments given below.

<Magnetic Layer>
(Ferromagnetic Powder)

Various powders that are commonly employed as ferromagnetic powder in the magnetic layers of magnetic recording media can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. A high fill rate is desirable from the perspective of increasing recording density.

(Binder)

The above magnetic recording medium contains binder along with ferromagnetic powder in the magnetic layer. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the nonmagnetic layer and in the backcoat layer described further below. Reference can be made to paragraphs 0028 to 0031 of Japanese Unexamined Patent Publication (KOKAI) No. 2010-24113, which is expressly incorporated herein by reference in its entirety, with regard to the above binders. At least one curing agent can also be employed as binder. It is desirable to employ a curing agent in addition to one or more of the resins set forth above. The curing agent is a compound having at least one, and desirably two or more, crosslinking functional groups per molecule. A curing agent having two or more isocyanate groups per molecule (polyisocyanate) is suitable. Reference can be made to Japanese Unexamined Patent Publication (KOKAI) No. 2011-216149, paragraphs 0124 and 0125, for details regarding polyisocyanate. The curing agent can be employed, for example, by adding a quantity of 0 to 80.0 weight parts, and from the perspective of increasing the strength of the magnetic layer, desirably 1.0 to 80.0 weight parts, per 100.0 weight parts of resin in the magnetic layer-forming composition.

(Abrasive)

Abrasive is contained along with ferromagnetic powder and binder in the magnetic layer of the above magnetic recording medium. Abrasive is a component that has the ability to remove material adhering to the head (abrasiveness) during running. From the perspective of exhibiting a good ability to remove material adhering to the head, nonmagnetic powder with a Mohs hardness of greater than or equal to 7 is desirable as abrasive. The Mohs hardness is a widely known index of the hardness of materials. The Mohs hardness specifies the hardness of a material on a 10-step scale. The highest Mohs hardness is that of diamond, which has a Mohs hardness of 10. The Mohs hardness of the abrasive is desirably greater than or equal to 8. The Mohs hardness is also desirably less than or equal to 9. Examples of abrasive are materials that are commonly employed as abrasives in the magnetic layer in the form of various powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, alumina powders such as α-alumina as well as silicon carbide powders are desirable. The average particle size of the abrasive, for example, falls within a range of 30 nm to 300 nm, desirably within a range of 50 nm to 200 nm. The content of abrasive in the magnetic layer desirably falls within a range of 1.0 weight part to 20.0 weight parts, preferably within a range of 3.0 weight part to 15.0 weight parts, and more preferably, within a range of 4.0 weight part to 10.0 weight parts, per 100.0 weight parts of ferromagnetic powder.

(Additives)

In addition to the components set forth above, one or more additives can be added as needed to the magnetic layer. Examples of additives are nonmagnetic powders known as protrusion-forming agents, lubricants, dispersing agents, dispersion adjuvants, antifungal agents, antistatic agents, oxidation inhibitors, and carbon black. Protrusion-forming agents are components that can form protrusions that suitably protrude from the surface of the magnetic layer, thus contributing to controlling the frictional properties of the surface of the magnetic layer. In one embodiment, carbon black functions as a protrusion-forming agent. Various known colloidal particles can also function as protrusion-forming agents. Additives can be employed by suitably selecting commercial products based on the properties desired. One or more lubricants selected from the group consisting of fatty acids, fatty acid amides, and fatty acid esters can be contained in the magnetic layer.

The above magnetic layer is disposed over a nonmagnetic layer on a nonmagnetic support. Details regarding the nonmagnetic layer and the nonmagnetic support will be given further below.

<Nonmagnetic Layer>

In the above magnetic recording medium, a nonmagnetic layer containing nonmagnetic powder and binder can be present between the nonmagnetic support and magnetic layer. The nonmagnetic layer satisfies conditions 1 to 4 as set forth above.

The nonmagnetic powder contained in the nonmagnetic layer is also as set forth above. The content (fill rate) of nonmagnetic powder in the nonmagnetic layer desirably falls within a range of 50 weight % to 90 weight %, preferably within a range of 60 weight % to 90 weight %.

For the binder, additives, and other details regarding the nonmagnetic layer, known techniques relating to nonmagnetic layers can be applied. For example, known techniques regarding the magnetic layer can be applied for the quantity and type of binder and the quantities and types of additives.

For example, the nonmagnetic layer of the magnetic recording medium in the present invention includes an essentially nonmagnetic layer that contains in the form of impurities, or intentionally, small quantities of ferromagnetic powder in addition to nonmagnetic powder. The term "essentially nonmagnetic" refers to a layer having either a residual magnetic flux density of less than or equal to 10 mT or a coercive force of less than or equal to 7.96 kA/m (100 Oe), or a layer having both a residual magnetic flux density of less than or equal to 10 mT and a coercive force of less than or equal to 7.96 kA/m (100 Oe). The nonmagnetic layer desirably lacks residual magnetic flux density and coercive force.

<Back Coat Layer>

The above magnetic recording medium can have a backcoat layer containing nonmagnetic powder and binder on the opposite side of the nonmagnetic support from the side on which the nonmagnetic layer and magnetic layer are present. The backcoat layer desirably incorporates carbon black and inorganic powder. Known techniques regarding the formulation of the magnetic layer and nonmagnetic layer can be applied to the binder and various optional additives contained in the backcoat layer.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Thickness of the Various Layers and the Nonmagnetic Support>

The thickness of the nonmagnetic layer in the above magnetic recording medium is as set forth for condition 4 above.

The thickness of the nonmagnetic support is, for example, 3.00 μm to 80.00 μm, desirably falling within a range of 3.00 μm to 50.00 μm, and preferably, falling within a range of 3.00 μm to 10.00 μm.

The thickness of the magnetic layer can be optimized based on the saturation magnetization level and head gap length of the magnetic head employed and the bandwidth of the recording signal. In general, it can be 10 nm to 100 nm. From the perspective of increasing the recording density, it desirably falls within a range of 30 nm to 100 nm, preferably within a range of 30 nm to 70 nm. It suffices for the magnetic layer to be a single layer, but it can also be separated into two or more layers having different magnetic characteristics, and a configuration relating to known multilayer magnetic layers can be adopted.

The thickness of the backcoat layer is desirably less than or equal to 0.90 μm, preferably falling within a range of 0.10 μm to 0.70 μm.

The method of measuring the thickness of the nonmagnetic layer is as set forth above. The thickness of other layers and the nonmagnetic support can also be determined by the same method. The thickness of other layers and the nonmagnetic support can also be obtained as design thicknesses calculated from the manufacturing conditions.

<Manufacturing Process>

(Preparation of Composition for Forming Each Layer)

The process of preparing the compositions for forming the magnetic layer, nonmagnetic layer and backcoat layer normally includes at least a kneading step, a dispersion step, and mixing steps provided before and after these steps as needed. Each of these steps can be divided into two or more stages. All of the starting materials in the form of ferromagnetic powder, binder, abrasive, nonmagnetic powder, various additives, solvent, and the like that are employed for the preparation of compositions for forming various layers can be added at the start, or part way through, any of these steps. One or more solvents that are normally employed for manufacturing a particulate magnetic recording medium can be employed as the solvent. Reference can be made to Japanese Unexamined Patent Publication (KOKAI) No. 2011-216149, paragraph 0153, for details regarding the solvent. An individual starting material can be divided for addition in two or more steps. For example, it is possible to separately add the binder in the kneading step, dispersing step, mixing step for the adjustment of viscosity after the dispersing step. Known manufacturing techniques can be employed in at least a part of the process in manufacturing the above magnetic recording medium. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Various known dispersing apparatus exploiting shearing forces, such as bead mills, ball mills, sand mills, and homomixers, can be employed as the dispersing apparatus. Dispersion beads are desirably employed in dispersion. Examples of dispersion beads are ceramic beads and glass beads. Zirconia beads are desirable. Two or more types of beads can be employed in combination. The bead diameter and bead fill rate of the dispersion beads are not specifically limited and can be set based on the powder being dispersed.

(Coating Step)

The nonmagnetic layer and magnetic layer can be formed by sequentially or simultaneously multilayer coating the nonmagnetic layer-forming composition and magnetic layer-forming composition. The backcoat layer can be formed by coating the backcoat layer-forming composition on the opposite side of the nonmagnetic support from the side on which the nonmagnetic layer and magnetic layer are present (or will be subsequently disposed). Reference can be made to Japanese Unexamined Patent Publication (KOKAI) No. 2010-231843, paragraph 0066, for details regarding coatings to form the various layers. The content of the above publication is expressly incorporated herein by reference in its entirety.

(Other Steps)

Reference can be made to Japanese Unexamined Patent Publication (KOKAI) No. 2010-231843, paragraphs 0067 to 0070, for details regarding other steps in the manufacturing of the magnetic recording medium.

The magnetic recording medium according to an aspect of the present invention as set forth above can exhibit good electromagnetic characteristics even with repeated running and is suitable as a magnetic recording medium for high-density recording.

[Magnetic Signal Reproduction Device]

An aspect of the present invention relates to a magnetic signal reproduction device containing the above magnetic recording medium and a magnetic signal reproduction head.

Details regarding the magnetic recording medium that is contained in the magnetic signal reproduction device are as set forth above.

Magnetic reproduction heads of known configuration can be employed without limitation as the magnetic reproduction head that is contained in the magnetic signal reproduction device.

It is desirable to further inhibit the drop in the electromagnetic characteristics caused by repeated running by further reducing the spacing beyond the level conventionally permitted in magnetic recording medium for high-density recording. In this regard, in a magnetic recording medium according to an aspect of the present invention, it is possible to achieve good electromagnetic characteristics even with repeated running in a magnetic signal reproduction device that reproduces a signal recorded at linear recording densities of greater than or equal to 260 kfci, for example. The present inventor assumes this to be the result of inhibiting an increase in spacing caused by head abrasion by having the nonmagnetic layer satisfy conditions 1 to 4 set forth above. Accordingly, the magnetic signal reproduction device containing the above magnetic recording medium is desirably a magnetic signal reproduction device that reproduces with a magnetic reproduction head a signal recorded at a linear recording density of greater than or 260 kfci (for example, 260 kfci to 350 kfci) on a magnetic recording medium. However, the linear recording density of the signal recorded on the magnetic recording medium according to an aspect of the present invention is not limited to the stated range. Other ranges are also possible.

EXAMPLES

The present invention will be described in greater detail below through Examples. However, the present invention is not limited to the embodiments shown in Examples. The "parts" indicated below denotes "weight parts".

Example 1

Formula of Magnetic Layer-Forming Composition

| (Magnetic liquid) | |
|---|---|
| Ferromagnetic hexagonal barium ferrite powder: (Coercivie force Hc: 175 kA/m (2,200 Oe), average particle size: 27 nm) | 100.0 parts |
| Oleic acid: | 1.5 parts |
| Vinyl chloride copolymer (MR-104 made by Zeon Corp.): | 10.0 parts |
| Sulfonic acid group-containing polyester polyurethane resin (UR-4800 made by Toyobo): | 4.0 parts |
| Methyl ethyl ketone: | 300.0 parts |
| Cyclohexanone: | 200.0 parts |

-continued (Abrasive liquid)

| | |
|---|---|
| α-Alumina (average particle size: 110 nm, Mohs hardness: 9): | 9.0 parts |
| Vinyl chloride copolymer (MR 110 made by Zeon Corp.): | 0.7 part |
| Cyclohexanone: | 20.0 parts |
| (Carbon black liquid) | |
| Carbon black (average particle size: 80 nm): | 0.5 part |
| Cyclohexanone: | 4.0 parts |
| (Lubricant and curing agent solution) | |
| Stearic acid: | 1.0 part |
| Amide stearate: | 0.3 part |
| Butyl stearate: | 1.5 parts |
| Methyl ethyl ketone: | 110.0 parts |
| Cyclohexanone: | 110.0 parts |
| Polyisocyanate (Coronate L made by Nippon Polyurethane): | 2.5 parts |

<Formula of Nonmagnetic Layer-Forming Composition>

| | |
|---|---|
| Carbon black (average particle size: 16 nm, dibutyl phthalate (DBP) oil abosrption capacity: 74 cm³/100 g): | 100.0 parts |
| Dispersing agent trioctylamine: | 6.0 parts |
| Vinyl chloride copolymer (MR-104 made by Zeon Corp.): | 12.0 parts |
| Polyurethane resin: | 8.0 parts |
| Branched side chain-containing polyester polyol/ diphenylmethane diisocyanate (containing polar —SO₃Na groups: 70 eq/ton) | |
| Methyl ethyl ketone: | 510.0 parts |
| Cyclohexanone: | 200.0 parts |
| (Lubricant and curing agent solution) | |
| Stearic acid: | 1.0 part |
| Amide stearate: | 0.3 part |
| Butyl stearate: | 1.5 parts |
| Methyl ethyl ketone: | 100.0 parts |
| Polyisocyanate (Coronate L made by Nippon Polyurethane): | 1.0 part |

<Formula of Backcoat Layer-Forming Composition>

| | |
|---|---|
| Fine particulate carbon black powder: (BPr800 made by Cabot Corp., average particle size: 17 nm) | 100.0 parts |
| Coarse particulate carbon black powder: (Thermal black made by Cancarb, average particle size: 270 nm) | 10.0 parts |
| α-Alumina: (Average particle size: 200 nm, Mohs hardness: 9) | 2.0 parts |
| Barium sulfate: (BF-1 made by Sakai Chemical Industry Co., Ltd.; average particle size: 50 nm, Mohs hardness: 3) | 5.0 parts |
| Nitrocellulose resin: | 140.0 parts |
| Polyurethane resin: | 15.0 parts |
| Polyester resin: | 5.0 parts |
| Dispersing agent: Copper oleate: | 5.0 parts |
| Copper phthalocyanine: | 5.0 parts |
| Methyl ethyl ketone: | 1,200.0 parts |
| Butyl acetate: | 300.0 parts |
| Toluene: | 600.0 parts |
| Polyisocyanate (Coronate L made by Nippon Polyurethane): | 10.0 parts |

<Preparation of Compositions for Forming Various Layers>

The above magnetic liquid was kneaded and dilution processed in an open kneader, and then subjected to 30 passes of dispersion treatment at a single pass residence time of 2 minutes, a bead fill rate of 80 volume %, and a rotor tip speed of 10 m/s using zirconia (ZrO₂) beads 0.1 mm in bead diameter (referred to as "Zr beads" hereinafter) in a horizontal bead mill dispersion apparatus.

Following the dispersion treatment, the magnetic liquid was charged to a dissolver stirring device along with the abrasive liquid, carbon black liquid, and lubricant and curing agent solution. The mixture was stirred for 30 minutes at a peripheral speed of 10 m/s, passed three times through a flow-type ultrasonic disperser at a flow rate of 7.5 kg/min, and then filtered with a filter having a pore diameter of 1 μm to prepare a magnetic layer-forming composition.

The nonmagnetic layer-forming composition was prepared by the following method.

With the exception of the lubricant and curing agent solution, the above components were kneaded and dilution processed in an open kneader, and then subjected to 10 passes of dispersion treatment at a single pass residence time of 6 minutes, a bead fill rate of 80 volume %, and a rotor tip speed of 10 m/s using Zr beads 0.1 mm in bead diameter in a horizontal bead mill dispersion apparatus. The above lubricant and curing agent solution was added, and the mixture was stirred and mixed in a dissolver stirring device to prepare a nonmagnetic layer-forming composition.

The backcoat layer-forming composition was prepared by the following method.

With the exception of the polyisocyanate in the formula of the backcoat layer-forming composition, the components were charged to a dissolver stirring apparatus, stirred for 30 minutes at a peripheral speed of 10 m/s, and then subjected to dispersion treatment in a horizontal bead mill dispersing apparatus. Subsequently, the polyisocyanate was added and the mixture was stirred and mixed in the dissolver stirring apparatus to prepare a backcoat layer-forming composition.

<Fabrication of Magnetic Tape>

The nonmagnetic layer-forming composition was coated in a manner calculated to yield a thickness of 1.00 μm upon drying on one of the surfaces of a polyethylene naphthalate support 4.50 μm in thickness and initially dried for 4 seconds in a drying zone at an air temperature of 40° C. and a blown air speed of 5 m/s, followed by drying for 4 seconds in a drying zone at an air temperature of 110° C. at a blown air speed of 5 m/s. Subsequently the backcoat layer-forming composition was coated and dried to a thickness of 0.50 μm on the other surface of the support, and the magnetic layer-forming composition was coated and dried to a thickness of 0.07 μm (70 nm) over the nonmagnetic layer.

Subsequently, calendering (surface smoothing treatment) was conducted at a calender roll surface temperature of 100° C. at a linear pressure of 300 kg/cm (294 kN/m) at a rate of 120 muffin with a calender comprised solely of metal rolls. After that, a heat treatment was conducted for 36 hours in an environment with an air temperature of 70° C. The product was then slit to a width of ½ inch (0.0127 meter) to obtain a slit product. The surface of the magnetic layer of the slit product was cleaned with a tape cleaning device in which nonwoven cloth and a razor blade had been mounted so as to press against the surface of the magnetic layer using a device having feeding and winding devices to obtain a magnetic recording medium (magnetic tape).

Example 2

With the exceptions that the quantity of vinyl chloride copolymer in the nonmagnetic layer-forming composition was changed to 18.0 parts and that of the polyurethane resin to 12.0 parts, a magnetic tape was fabricated by the same method as in Example 1.

Example 3

With the exceptions that the quantity of vinyl chloride copolymer in the nonmagnetic layer-forming composition was changed to 21.0 parts and that of the polyurethane resin to 14.0 parts, a magnetic tape was fabricated by the same method as in Example 1.

Example 4

With the exceptions that the quantity of vinyl chloride copolymer in the nonmagnetic layer-forming composition was changed to 27.0 parts and that of the polyurethane resin to 16.0 parts, a magnetic tape was fabricated by the same method as in Example 1.

Example 5

With the exception that the residence time of one pass through the horizontal bead mill dispersion apparatus was changed to 12 seconds during preparation of the nonmagnetic layer-forming composition, a magnetic tape was prepared by the same method as in Example 1.

Example 6

With the exception that the residence time of one pass through the horizontal bead mill dispersion apparatus was changed to 3 minutes during preparation of the nonmagnetic layer-forming composition, a magnetic tape was prepared by the same method as in Example 1.

Example 7

With the exception that the quantity of trioctylamine in the nonmagnetic layer-forming composition was changed to 12.0 parts, a magnetic tape was fabricated by the same method as in Example 1.

Example 8

With the exception that the formula of the nonmagnetic layer-forming composition was changed as follows, a magnetic tape was prepared by the same method as in Example 1.

| | |
|---|---|
| Carbon black (average particle size: 16 nm, DBP oil absorption capacity: 74 cm$^3$/100 g): | 50.0 parts |
| Nonmagnetic inorganic powder (α-iron oxide, average particle size: 0.150 μm, average acicular ratio: 7, Brunauer-Emmett-Teller (BET) specific surface area: 52 m$^2$/g): | 50.0 parts |
| Dispersing agent trioctylamine: | 6.0 parts |
| Vinyl chloride copolymer (MR-104 made by Zeon Corp.): | 10.0 parts |
| Polyurethane resin: Branched side chain-containing polyester polyol/diphenylmethane diisocyanate (containing polar —SO$_3$Na groups: 70 eq/ton) | 4.0 parts |
| Methyl ethyl ketone: | 510.0 parts |
| Cyclohexanone: | 200.0 parts |
| (Lubricant and curing agent solution) | |
| Stearic acid: | 1.0 part |
| Amide stearate: | 0.3 part |
| Butyl stearate: | 1.5 parts |
| Methyl ethyl ketone: | 100.0 parts |
| Polyisocyanate (Coronate L made by Nippon Polyurethane): | 1.0 part |

Example 9

With the exception that the formula of the nonmagnetic layer-forming composition was changed as indicated below, a magnetic tape was fabricated by the same method as in Example 1.

With the exceptions that the quantity of carbon black in the nonmagnetic layer-forming composition was changed to 35.0 parts, the quantity of nonmagnetic inorganic powder (α-iron oxide) was changed to 65.0 parts, the quantity of vinyl chloride copolymer was changed to 9.0 parts, and the quantity of polyurethane resin was changed to 2.0 parts, a magnetic recording medium was fabricated by the same method as in Example 1.

Example 10

With the exception that the thickness of the nonmagnetic layer was changed to 0.40 μm by changing the amount of nonmagnetic layer-forming composition that was applied, a magnetic tape was fabricated by the same method as in Example 1.

Example 11

With the exception that the thickness of the nonmagnetic layer was changed to 0.20 μm by changing the amount of nonmagnetic layer-forming composition that was applied, a magnetic tape was fabricated by the same method as in Example 1.

Comparative Example 1

With the exceptions that the quantity of vinyl chloride copolymer in the nonmagnetic layer-forming composition was changed to 31.0 parts, the quantity of polyurethane resin was changed to 19.0 parts, and the quantity of trioctylamine was changed to 1.0 part, a magnetic tape was fabricated by the same method as in Example 1.

Comparative Example 2

With the exceptions that the quantity of vinyl chloride copolymer in the nonmagnetic layer-forming composition was changed to 10.0 parts, the quantity of polyurethane resin was changed to 4.0 parts, and the quantity of trioctylamine was changed to 12.0 parts, a magnetic tape was fabricated by the same method as in Example 1.

Comparative Example 3

With the exceptions that carbon black with an average particle size of 13 nm and DBP oil absorption capacity of 64 cm$^3$/100 g was employed as the carbon black in the nonmagnetic layer-forming composition, the quantity of vinyl chloride copolymer was changed to 10.0 parts, the quantity of polyurethane resin was changed to 4.0 parts, the quantity of trioctylamine was changed to 12.0 parts, the drying conditions following coating of the nonmagnetic layer-forming composition were changed such that after initial drying for 4 seconds in a drying zone at an air temperature of 100° C. and a blown air speed of 5 m/s, drying was conducted for 4 seconds in a drying zone at an air temperature of 110° C. and a blown air speed of 5 m/s, a magnetic tape was fabricated by the same method as in Example 1.

Comparative Example 4

With the exceptions that carbon black having an average particle size of 24 nm and a DBP oil absorption capacity of 77 cm$^3$/100 g was employed as the carbon black in the nonmagnetic layer-forming composition, the quantity of vinyl chloride copolymer was changed to 18.0 parts, the quantity of polyurethane resin was changed to 12.0 parts, the quantity of trioctylamine was changed to 1.0 part, and the drying conditions after coating the nonmagnetic layer-forming composition were changed such that after initial drying for 4 seconds in a drying zone at an air temperature of 100° C. and a blown air speed of 10 m/s, drying was conducted for 4 seconds in a drying zone at an air temperature of 110° C. and a blown air speed of 5 m/s, a magnetic tape was fabricated by the same method as in Example 1.

Comparative Example 5

With the exceptions that carbon black having an average particle size of 24 nm and a DBP oil absorption capacity of 77 $cm^3$/100 g was employed as the carbon black in the nonmagnetic layer-forming composition and the quantity of trioctylamine was changed to 1.0 part, a magnetic tape was fabricated by the same method as in Example 1.

Comparative Example 6

With the exceptions that carbon black having an average particles size of 13 nm and a DBP oil absorption of 64 $cm^3$/100 g was employed as the carbon black in the nonmagnetic layer-forming composition and the quantity of trioctylamine was changed to 1.0 part, a magnetic tape was fabricated by the same method as in Example 1.

Comparative Example 7

With the exception that the thickness of the nonmagnetic layer was changed to 0.15 μm by changing the amount of nonmagnetic layer-forming composition that was applied, a magnetic tape was fabricated by the same method as in Example 1.

Comparative Example 8

With the exception that the quantity of vinyl chloride copolymer in the nonmagnetic layer-forming composition was changed to 31.0 parts and the quantity of polyurethane resin was changed to 19.0 parts, a magnetic tape was fabricated by the same method as in Example 1.

Comparative Example 9

With the exception that the quantity of vinyl chloride copolymer in the nonmagnetic layer-forming composition was changed to 10.0 parts and the quantity of polyurethane resin was changed to 4 parts, a magnetic tape was fabricated by the same method as in Example 1.

Comparative Example 10

With the exception that the quantity of trioctylamine in the nonmagnetic layer-forming composition was changed to 1.0 part, a magnetic tape was fabricated by the same method as in Example 1.

Comparative Example 11

With the exception that 6.0 parts of methyl acid phosphate were employed instead of the 6.0 parts of trioctylamine in the nonmagnetic layer-forming composition, a magnetic tape was fabricated by the same method as in Example 1.

Comparative Example 12

With the exception that carbon black having an average particle size of 76 nm and a DBP oil absorption capacity of 69 $cm^3$/100 g was employed as the carbon black on the nonmagnetic layer-forming composition, a magnetic tape was fabricated by the same method as in Example 1.

Comparative Example 13

With the exception that carbon black having an average particle size of 10 nm and a DBP oil absorption capacity of 73 $cm^3$/100 g was employed as the carbon black on the nonmagnetic layer-forming composition, a magnetic tape was fabricated by the same method as in Example 1.

Comparative Example 14

With the exception that the drying conditions after coating the nonmagnetic layer-forming composition were changed such that after initial drying for 4 seconds in a drying zone at a blown air speed of 10 m/s at an air temperature of 100° C., drying was conducted for 4 seconds in a drying zone at a blown air speed of 5 m/s at an air temperature of 110° C., a magnetic tape was fabricated by the same method as in Example 1.

Comparative Example 15

With the exception that the formula of the nonmagnetic layer-forming composition was changed to the following, a magnetic tape was fabricated by the same method as in Example 1:

| | |
|---|---|
| Carbon black (average particles diameter: 16 nm, DBP oil absorption capacity: 74 $cm^3$/100 g): | 20.0 parts |
| Nonmagnetic inorganic powder (α-iron oxide, average particle size: 0.150 μm, average acicular ratio: 7, BET specific surface area: 52 $m^2$/g): | 80.0 parts |
| Dispersing agent trioctylamine: | 6.0 parts |
| Vinyl chloride copolymer (MR-104 made by Zeon Corp.): | 6.0 parts |
| Polyurethane resin: | 3.0 parts |
| Branched side chain-containing polyester polyol/diphenylmethane diisocyanate (containing polar —$SO_3Na$ groups: 70 eq/ton) | |
| Methyl ethyl ketone: | 510.0 parts |
| Cyclohexanone: | 200.0 parts |
| (Lubricant and curing agent solution) | |
| Stearic acid: | 1.0 part |
| Amide stearate: | 0.3 part |
| Butyl stearate: | 1.5 parts |
| Methyl ethyl ketone: | 100.0 parts |
| Polyisocyanate (Coronate L made by Nippon Polyurethane): | 1.0 part |

Comparative Example 16

With the exception that the formula of the nonmagnetic layer-forming composition was changed to the following, a magnetic tape was fabricated by the same method as in Example 1:

| | |
|---|---|
| Nonmagnetic inorganic powder (α-iron oxide, average particle size: 0.150 μm, average acicular ratio: 7, BET specific surface area: 52 $m^2$/g): | 100.0 parts |
| Dispersing agent trioctylamine: | 6.0 parts |
| Vinyl chloride copolymer (MR-104 made by Zeon Corp.): | 5.3 parts |
| Polyurethane resin: | 2.0 parts |
| Branched side chain-containing polyester polyol/diphenylmethane diisocyanate (containing polar —$SO_3Na$ groups: 70 eq/ton) | |
| Methyl ethyl ketone: | 510.0 parts |
| Cyclohexanone: | 200.0 parts |

-continued (Lubricant and curing agent solution)

| | |
|---|---|
| Stearic acid: | 1.0 part |
| Amide stearate: | 0.3 part |
| Butyl stearate: | 1.5 parts |
| Methyl ethyl ketone: | 100.0 parts |
| Polyisocyanate (Coronate L made by Nippon Polyurethane): | 1.0 part |

Comparative Example 17

With the exception that the formula of the nonmagnetic layer-forming composition was changed to the following, a magnetic tape was fabricated by the same method as in Example 1:

| | |
|---|---|
| Carbon black (average particles diameter: 16 nm, DBP oil absorption capacity: 74 cm³/100 g): | 15.0 parts |
| Nonmagnetic inorganic powder (TiO₂ crystalline rutile, average particle size: 0.035 μm, BET specific surface area: 40 m²/g): | 85.0 parts |
| Vinyl chloride copolymer (MR-104 made by Zeon Corp.): | 14.0 parts |
| Polyurethane resin: | 5.0 parts |
| Branched side chain-containing polyester polyol/diphenylmethane diisocyanate (containing polar —SO₃Na groups: 70 eq/ton) | |
| Methyl ethyl ketone: | 510.0 parts |
| Cyclohexanone: | 200.0 parts |
| (Lubricant and curing agent solution) | |
| Stearic acid: | 1.0 part |
| Amide stearate: | 0.3 part |
| Butyl stearate: | 1.5 parts |
| Methyl ethyl ketone: | 100.0 parts |
| Polyisocyanate (Coronate L made by Nippon Polyurethane): | 5.5 parts |

Comparative Example 18

With the exception that the formula of the nonmagnetic layer-forming composition was changed to the following, a magnetic tape was fabricated by the same method as in Example 1:

| | |
|---|---|
| Carbon black (average particles diameter: 16 nm, DBP oil absorption capacity: 74 cm³/100 g): | 20.0 parts |
| Nonmagnetic inorganic powder (α-iron oxide, average particle size: 0.150 μm, average acicular ratio: 7, BET specific surface area: 52 m²/g): | 80.0 parts |
| Phenylphosphonic acid: | 3.0 parts |
| Polyurethane resin: | 6.0 parts |
| Branched side chain-containing polyester polyol/diphenylmethane diisocyanate (containing polar —SO₃Na groups: 70 eq/ton) | |
| Methyl ethyl ketone: | 510.0 parts |
| Cyclohexanone: | 200.0 parts |
| (Lubricant and curing agent solution) | |
| Stearic acid: | 1.0 part |
| Amide stearate: | 0.3 part |
| Butyl stearate: | 1.5 parts |
| Methyl ethyl ketone: | 100.0 parts |
| Polyisocyanate (Coronate L made by Nippon Polyurethane): | 6.0 parts |

Comparative Example 19

With the exception that the formula of the nonmagnetic layer-forming composition was changed to the following, a magnetic tape was fabricated by the same method as in Example 1:

| | |
|---|---|
| Nonmagnetic inorganic powder (α-iron oxide, average particle size: 0.150 μm, average acicular ratio: 7, BET specific surface area: 52 m²/g): | 100.0 parts |
| Vinyl chloride copolymer (MR-104 made by Zeon Corp.): | 6.5 parts |
| Polyurethane resin: | 3.5 parts |
| Branched side chain-containing polyester polyol/diphenylmethane diisocyanate (containing polar —SO₃Na groups: 70 eq/ton) | |
| Methyl ethyl ketone: | 510.0 parts |
| Cyclohexanone: | 200.0 parts |
| (Lubricant and curing agent solution) | |
| Stearic acid: | 1.0 part |
| Amide stearate: | 0.3 part |
| Butyl stearate: | 1.5 parts |
| Methyl ethyl ketone: | 100.0 parts |
| Polyisocyanate (Coronate L made by Nippon Polyurethane): | 1.0 part |

[Evaluation Methods]

1. Void Ratio, R+σr, R−σr, N+σn, N−σn, Nonmagnetic Layer Thickness

These various values were obtained by the methods set forth above for the magnetic recording media of Examples and Comparative Examples.

The samples for sectional observation were prepared by the following method.

(i) A sample measuring 10 mm in the direction of width and 10 mm in the direction of thickness of the magnetic tape was cut out with a razor.

A protective film was formed on the surface of the magnetic layer of the sample that had been cut out to obtain a sample with a protective film. The protective film was formed by the following method.

A platinum (Pt) film (30 nm in thickness) was formed by sputtering on the surface of the magnetic layer of the sample. Sputtering of the platinum film was conducted under the following conditions.

<Platinum Film Sputtering Conditions>

Target: Pt

| | |
|---|---|
| Degree of vacuum within chamber of sputtering device: | Less than or equal to 7 Pa |

Current: 15 mA

A carbon film 100 to 150 nm in thickness was then formed on the sample with platinum film that had been prepared. The carbon film was formed by a chemical vapor deposition (CVD) mechanism employing gallium ions (Ga) equipped with the focused ion beam (FIB) device employed in (ii) below.

(ii) The sample with protective film prepared in (i) above was FIB processed with a gallium ion (Ga⁺) beam by means of an FIB device to expose the cross-section of the magnetic tape. The acceleration voltage in FIB processing was 30 kV and the probe current was 1,300 pA.

The sample for sectional observation thus exposed was observed by SEM to obtain the various values listed above.

2. Calculation of Amount of Drop in Signal-to-Noise Ratio (SN Ratio) with Repeated Running The magnetic tapes of Examples and Comparative Examples were assembled into magnetic tape cartridges. A total of ten tape cartridges were prepared for each of Examples and Comparative Examples.

The electromagnetic characteristics (S/N ratio) of the magnetic tapes during initial running and after repeated running were measured with a ½ inch (0.0127 meter) reel tester with secured head by the following method in an environment with a temperature of 23° C. and a relative humidity of 45%.

recording medium in the drive, and that good electromagnetic characteristics would be exhibited over an extended period by the magnetic recording medium.

The above results are given in Table 1.

TABLE 1

| | Voids in nonmagnetic layer | | | | | | | | Thickness of nonmagnetic layer [μm] | Amount of drop in S/N ratio with repeated running [dB] |
|---|---|---|---|---|---|---|---|---|---|---|
| | Void ratio [%] | R [nm] | σr [nm] | R + σr [nm] | R − σr [nm] | N [voids/μm²] | σn [voids/μm²] | N + σn [voids/μm²] | N − σn [voids/μm²] | | |
| Ex. 1 | 23.0 | 39.3 | 16.2 | 55.5 | 23.1 | 172 | 9 | 181 | 163 | 1.00 | 0.2 |
| Ex. 2 | 18.1 | 35.0 | 14.0 | 49.0 | 21.0 | 159 | 6 | 165 | 152 | 1.00 | 0.3 |
| Ex. 3 | 17.4 | 34.9 | 12.2 | 47.1 | 22.7 | 140 | 7 | 147 | 133 | 1.00 | 0.5 |
| Ex. 4 | 14.2 | 32.0 | 10.8 | 42.8 | 21.2 | 129 | 8 | 137 | 121 | 1.00 | 0.9 |
| Ex. 5 | 20.0 | 37.1 | 14.8 | 51.9 | 22.3 | 156 | 4 | 160 | 152 | 1.00 | 0.4 |
| Ex. 6 | 24.5 | 40.4 | 17.1 | 57.5 | 23.3 | 161 | 5 | 166 | 156 | 1.00 | 0.4 |
| Ex. 7 | 21.0 | 39.3 | 13.1 | 52.4 | 26.1 | 150 | 11 | 161 | 139 | 1.00 | 0.3 |
| Ex. 8 | 24.0 | 40.0 | 16.9 | 57.0 | 23.1 | 152 | 6 | 158 | 146 | 1.00 | 0.6 |
| Ex. 9 | 24.5 | 40.4 | 17.4 | 57.8 | 23.0 | 148 | 10 | 158 | 138 | 1.00 | 0.9 |
| Ex. 10 | 22.5 | 39.0 | 16.1 | 55.1 | 22.9 | 173 | 9 | 182 | 164 | 0.40 | 0.3 |
| Ex. 11 | 23.1 | 38.2 | 16.3 | 54.5 | 21.9 | 165 | 7 | 172 | 158 | 0.20 | 0.9 |
| Comp. Ex. 1 | 11.2 | 33.5 | 11.9 | 45.4 | 21.6 | 130 | 5 | 135 | 125 | 1.00 | 2.1 |
| Comp. Ex. 2 | 26.8 | 39.1 | 17.5 | 56.6 | 21.6 | 158 | 7 | 165 | 151 | 1.00 | 1.4 |
| Comp. Ex. 3 | 21.8 | 39.2 | 15.0 | 54.2 | 24.2 | 195 | 37 | 232 | 158 | 1.00 | 1.3 |
| Comp. Ex. 4 | 15.4 | 34.6 | 11.0 | 45.6 | 23.6 | 130 | 34 | 164 | 96 | 1.00 | 1.4 |
| Comp. Ex. 5 | 22.0 | 45.1 | 20.0 | 65.1 | 25.1 | 152 | 5 | 157 | 147 | 1.00 | 1.5 |
| Comp. Ex. 6 | 15.2 | 32.9 | 16.9 | 49.8 | 16.0 | 157 | 6 | 163 | 151 | 1.00 | 1.8 |
| Comp. Ex. 7 | 21.9 | 39.3 | 15.7 | 55.0 | 23.6 | 169 | 10 | 179 | 159 | 0.15 | 1.6 |
| Comp. Ex. 8 | 7.8 | 27.1 | 9.8 | 36.9 | 17.3 | 120 | 5 | 125 | 115 | 1.00 | 2.5 |
| Comp. Ex. 9 | 28.2 | 43.8 | 21.7 | 65.5 | 22.1 | 155 | 10 | 165 | 145 | 1.00 | 1.7 |
| Comp. Ex. 10 | 23.3 | 41.2 | 22.6 | 63.8 | 18.6 | 142 | 4 | 146 | 138 | 1.00 | 1.8 |
| Comp. Ex. 11 | 27.0 | 43.0 | 28.7 | 71.7 | 14.3 | 155 | 7 | 162 | 148 | 1.00 | 1.9 |
| Comp. Ex. 12 | 27.5 | 44.0 | 17.1 | 61.1 | 26.9 | 142 | 8 | 150 | 134 | 1.00 | 1.5 |
| Comp. Ex. 13 | 12.1 | 35.0 | 18.3 | 53.3 | 16.7 | 175 | 4 | 179 | 171 | 1.00 | 2.0 |
| Comp. Ex. 14 | 22.0 | 38.5 | 17.0 | 55.5 | 21.5 | 150 | 39 | 189 | 111 | 1.00 | 1.6 |
| Comp. Ex. 15 | 26.0 | 39.0 | 18.8 | 57.8 | 20.2 | 151 | 7 | 158 | 144 | 1.00 | 2.2 |
| Comp. Ex. 16 | 27.0 | 40.0 | 21.2 | 61.2 | 18.8 | 147 | 6 | 153 | 141 | 1.00 | 2.6 |
| Comp. Ex. 17 | 17.0 | 34.9 | 18.2 | 53.1 | 16.8 | 150 | 4 | 154 | 146 | 1.00 | 1.9 |
| Comp. Ex. 18 | 19.0 | 36.4 | 20.2 | 56.5 | 16.2 | 154 | 13 | 167 | 141 | 1.00 | 1.6 |
| Comp. Ex. 19 | 20.0 | 37.1 | 21.9 | 59.0 | 15.2 | 156 | 11 | 167 | 145 | 1.00 | 2.3 |

A head/tape relative speed of 5.5 m/s was adopted. A metal-in-gap (MIG) head (gap length: 0.15 μm, track width: 1.0 μm) was employed in recording. The recording current was set to the optimal recording current for each magnetic tape. A giant magnetoresistive (GMR) head with a read width of 0.5 μm, a shield gap of 0.1 μm, and an element thickness of 15 nm was employed as the reproduction head. A signal was recorded at a linear recording density of 270 kfci. The reproduced signal was measured with a spectrum analyzer made by Shibasoku Corp. The ratio of the carrier signal output to the integrated noise of the spectrum full bandwidth was adopted as the S/N ratio. The fully stabilized signal after the start of magnetic tape running was employed as the signal. Each magnetic tape cartridge was subjected to 500 passes of running (250 times back and forth), 800 m per pass, under the above conditions. This was performed on 10 magnetic tape cartridges of each of Examples and Comparative Examples.

The S/N ratio was measured for the first pass of the first cartridge and the first pass of the 10th cartridge and the difference ((S/N ratio of first pass of first cartridge)−(S/N ratio of first pass 10th cartridge)) was adopted as the drop in the S/N ratio. This is given in Table 1. A drop of less than or equal to 1.0 dB in the S/N ratio permitted the determination that there was little decrease in the electromagnetic characteristics even with repeated running of the magnetic Based on the results in Table 1, the magnetic tapes of Examples were found to undergo little drop in the S/N ratio with repeated running and to exhibit good electromagnetic characteristics even with repeated running.

The binder content per 100.0 volume parts of the combined content of nonmagnetic powder and binder in the nonmagnetic layer is given in Table 2 for the magnetic tapes of Examples and Comparative Examples. The values given in Table 2 were calculated as follows. The value obtained by combining the contents of the above vinyl chloride copolymer, polyurethane resin, and polyisocyanate based on weight with the content based on volume calculated from the specific gravity of each component was adopted as the total binder content based on volume. The content of the nonmagnetic powder based on volume was calculated based on the content of the nonmagnetic powder based on weight and the specific gravity of the nonmagnetic powder, as well. The binder content of the nonmagnetic layer shown in Table 2 was calculated using the calculated values.

TABLE 2

| | AlFeSil wear width [μm] |
|---|---|
| Ex. 1 | 18 |
| Ex. 2 | 17 |

TABLE 2-continued

| | AlFeSil wear width [μm] |
|---|---|
| Ex. 3 | 23 |
| Ex. 4 | 27 |
| Ex. 5 | 22 |
| Ex. 6 | 25 |
| Ex. 7 | 19 |
| Ex. 8 | 24 |
| Ex. 9 | 29 |
| Ex. 10 | 25 |
| Ex. 11 | 31 |
| Comp. Ex. 1 | 48 |
| Comp. Ex. 2 | 45 |
| Comp. Ex. 3 | 38 |
| Comp. Ex. 4 | 42 |
| Comp. Ex. 5 | 49 |
| Comp. Ex. 6 | 52 |
| Comp. Ex. 7 | 51 |
| Comp. Ex. 8 | 55 |
| Comp. Ex. 9 | 39 |
| Comp. Ex. 10 | 42 |
| Comp. Ex. 11 | 46 |
| Comp. Ex. 12 | 38 |
| Comp. Ex. 13 | 56 |
| Comp. Ex. 14 | 43 |
| Comp. Ex. 15 | 51 |
| Comp. Ex. 16 | 55 |
| Comp. Ex. 17 | 47 |
| Comp. Ex. 18 | 41 |
| Comp. Ex. 19 | 49 |

Measurement of AlFeSil Wear Width

The surface of the magnetic layer of the magnetic tape was brought into contact at a lap angle of 12 degrees with one edge of a square bar of AlFeSil in a manner orthogonal to the longitudinal direction of the AlFeSil square bar (square bar specified by ECMA (European Computer Manufacturers Association)-288/Annex H/112) in an environment with a controlled temperature of 23° C. and a controlled relative humidity of 45%. In that state, a 580 m length of magnetic tape was run back and forth 50 times at a speed of 3 m/s with a tension of 1.0 N. The "AlFeSil square bar" was a square bar made of AlFeSil, which is a Sendust-based alloy.

The edge of the square bar was observed from above with an optical microscope and the wear width (AlFeSil wear width) as described based on FIG. 1 at paragraph 0015 in Japanese Unexamined Patent Publication (KOKAI) No. 2007-026564. The measurement results are given in Table 3.

The AlFeSil wear width is a value that can serve as an indicator of head abrasion. The magnetic tapes of Examples, which exhibited good electromagnetic characteristics even with repeated running, presented smaller AlFeSil wear widths than the magnetic tapes of Comparative Examples, as shown in Table 3. Based on this result, it can be determined that the drop in the electromagnetic characteristics due to repeated running could be inhibited by inhibiting head abrasion.

TABLE 3

| | Content of binder in nonmagnetic layer [volume parts per 100.0 volume parts of total content of nonmagnetic powder and binder] |
|---|---|
| Ex. 1 | 25.6 |
| Ex. 2 | 33.7 |
| Ex. 3 | 37.1 |
| Ex. 4 | 41.9 |
| Ex. 5 | 25.6 |
| Ex. 6 | 25.6 |
| Ex. 7 | 25.6 |
| Ex. 8 | 26.7 |
| Ex. 9 | 27.0 |
| Ex. 10 | 25.6 |
| Ex. 11 | 25.6 |
| Comp. Ex. 1 | 45.5 |
| Comp. Ex. 2 | 19.7 |
| Comp. Ex. 3 | 19.7 |
| Comp. Ex. 4 | 33.7 |
| Comp. Ex. 5 | 25.6 |
| Comp. Ex. 6 | 25.6 |
| Comp. Ex. 7 | 25.6 |
| Comp. Ex. 8 | 45.5 |
| Comp. Ex. 9 | 25.6 |
| Comp. Ex. 10 | 25.6 |
| Comp. Ex. 11 | 25.6 |
| Comp. Ex. 12 | 25.6 |
| Comp. Ex. 13 | 25.6 |
| Comp. Ex. 14 | 25.6 |
| Comp. Ex. 15 | 25.5 |
| Comp. Ex. 16 | 25.7 |
| Comp. Ex. 17 | 38.3 |
| Comp. Ex. 18 | 47.1 |
| Comp. Ex. 19 | 34.2 |

An aspect of the present invention is useful in the field of manufacturing magnetic recording media for high-density recording, such as backup tapes.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium,
which comprises a nonmagnetic layer comprising nonmagnetic powder and binder on a nonmagnetic support and a magnetic layer comprising ferromagnetic powder, binder, and abrasive on the nonmagnetic layer,
wherein the nonmagnetic layer satisfies conditions 1 to 4 below:
condition 1: a ratio of as total area accounted for by voids observed to an area of a region being observed falls within a range of 13.0% to 25.0% in a sectional image taken by a scanning electron microscope;
condition 2: $R+\sigma r$ is less than or equal to 58.0 nm and $R-\sigma r$ is greater than or equal to 21.0 nm when denoting an average value of diameters of corresponding circles for voids observed in the sectional image as R, denoting a standard deviation of the diameters of the corresponding circles as $\sigma r$, and denoting R and $\sigma r$ in units of nm;
condition 3: $N+\sigma n$ is less than or equal to 185 voids/$\mu m^2$ and $N-\sigma n$ is greater than or equal to 120 voids/$\mu m^2$ when denoting an average number of voids observed per $\mu m^2$ unit area of the region being observed in the sectional image as N, denoting a standard deviation of the number as $\sigma n$, and denoting N and $\sigma n$ in units of voids/$\mu m^2$;
condition 4: a thickness of the nonmagnetic layer is greater than or equal to 0.20 μm.

2. The magnetic recording medium according to claim 1, wherein the nonmagnetic powder contained in the nonmagnetic layer comprises at least carbon black.

3. The magnetic recording medium according to claim 2, wherein a content of the carbon black in the nonmagnetic layer is greater than or equal to 30.0 weight parts per 100.0 weight parts of the nonmagnetic powder.

4. The magnetic recording medium according to claim 2, wherein a content of the carbon black in the nonmagnetic layer is greater than or equal to 40.0 weight parts per 100.0 weight parts of the nonmagnetic powder.

5. The magnetic recording medium according to claim 1, wherein a content of the binder in the nonmagnetic layer is less than or equal to 42.0 volume parts per 100.0 volume parts of the nonmagnetic powder and the binder combined.

6. The magnetic recording medium according to claim 1, wherein a content of the binder in the nonmagnetic layer is less than or equal to 40.0 volume parts per 100.0 volume parts of the nonmagnetic powder and the binder combined.

7. The magnetic recording medium according to claim 6, wherein the nonmagnetic powder contained in the nonmagnetic layer comprises at least carbon black the average particle size of which ranges from 10 nm to 30 nm, and the content of the carbon black the average particle size of which ranges from 10 nm to 30 nm in the nonmagnetic layer is greater than or equal to 40.0 weight parts per 100.0 weight parts of the nonmagnetic powder.

8. The magnetic recording medium according to claim 1, wherein the ratio in condition 1 ranges from 15.0% to 25.0%.

9. The magnetic recording medium according to claim 1, wherein condition 4 is condition 4-1 below:
condition 4-1: a thickness of the nonmagnetic layer is greater than or equal to 0.20 μm but less than or equal to 2.00 μm.

10. The magnetic recording medium according to claim 1, wherein condition 4 is condition 4-2 below:
condition 4-2: a thickness of the nonmagnetic layer is greater than or equal to 0.30 μm but less than or equal to 1.50 μm.

11. The magnetic recording medium according to claim 3, wherein the ratio in condition 1 ranges from 15.0% to 25.0%.

12. The magnetic recording medium according to claim 3, wherein condition 4 is condition 4-1 below:
condition 4-1: a thickness of the nonmagnetic layer is greater than or equal to 0.20 μm but less than or equal to 2.00 μm.

13. The magnetic recording medium according to claim 3, wherein condition 4 is condition 4-2 below:
condition 4-2: a thickness of the nonmagnetic layer is greater than or equal to 0.30 μm but less than or equal to 1.50 μm.

14. The magnetic recording medium according to claim 5, wherein the ratio in condition 1 ranges from 15.0% to 25.0%.

15. The magnetic recording medium according to claim 5, wherein condition 4 is condition 4-1 below:
condition 4-1: a thickness of the nonmagnetic layer is greater than or equal to 0.20 μm but less than or equal to 2.00 μm.

16. The magnetic recording medium according to claim 5, wherein condition 4 is condition 4-2 below:
condition 4-2: a thickness of the nonmagnetic layer is greater than or equal to 0.30 μm but less than or equal to 1.50 μm.

17. The magnetic recording medium according to claim 7, wherein the ratio in condition 1 ranges from 15.0% to 25.0%.

18. The magnetic recording medium according to claim 7, wherein condition 4 is condition 4-1 below:
condition 4-1: a thickness of the nonmagnetic layer is greater than or equal to 0.20 μm but less than or equal to 2.00 μm.

19. The magnetic recording medium according to claim 7, wherein condition 4 is condition 4-2 below:
condition 4-2: a thickness of the nonmagnetic layer is greater than or equal to 0.30 μm but less than or equal to 1.50 μm.

* * * * *